United States Patent
Lin

(10) Patent No.: US 8,639,026 B2
(45) Date of Patent: Jan. 28, 2014

(54) BACKGROUND MODEL LEARNING SYSTEM FOR LIGHTING CHANGE ADAPTATION UTILIZED FOR VIDEO SURVEILLANCE

(75) Inventor: Horng-Horng Lin, Hsinchu County (TW)

(73) Assignee: QNAP Systems, Inc., New Taipei (TW)

( * ) Notice: Subject to any disclaimer, the term of this patent is extended or adjusted under 35 U.S.C. 154(b) by 214 days.

(21) Appl. No.: 12/914,957

(22) Filed: Oct. 28, 2010

(65) Prior Publication Data

US 2012/0106834 A1    May 3, 2012

(51) Int. Cl.
*G06K 9/62* (2006.01)
*G06K 9/00* (2006.01)

(52) U.S. Cl.
USPC ............................ 382/155; 382/103; 382/160

(58) Field of Classification Search
None
See application file for complete search history.

(56) References Cited

PUBLICATIONS

Stauffer et al., "Adaptive Background Mixture Models for Real-Time Tracking," Jun. 25, 1999, IEEE Computer Society Conference on Computer Vision and Pattern Recognition, vol. 2, 7 pages.*

* cited by examiner

*Primary Examiner* — David Zarka
*Assistant Examiner* — Ryan P Potts
(74) *Attorney, Agent, or Firm* — Jianq Chyun IP Office

(57) ABSTRACT

A background model learning system for lighting change adaptation for video surveillance is provided. The system includes a background model estimation unit that estimates a background model for a scene of interest; a foreground map construction unit that constructs a reference foreground map of the time instance; and a lighting change processing unit that revises the reference foreground map by reducing false foreground regions resulting from lighting changes. The revised foreground map is then sent back to both the background model estimation unit and the lighting change processing unit as feedbacks for model learning rate tuning in background model estimation and map integration in lighting change processing, respectively, for the next time instance.

9 Claims, 3 Drawing Sheets

BACKGROUND MODEL LEARNING SYSTEM FOR LIGHTING CHANGE ADAPTATION UTILIZED FOR VIDEO SURVEILLANCE

REFERENCES

C. Stauffer and W. Grimson, "Adaptive background mixture models for real-time tracking," in *Proc. IEEE Conf. Computer Vision and Pattern Recognition*, vol. 2, 1999, pp. 246-252.

BACKGROUND OF THE INVENTION

The present invention relates generally to a video surveillance system using background subtraction to identify foreground abnormalities. Particularly, the present invention relates to the learning of a background model for a scene of interest that is robust to drastic lighting changes.

For video surveillance systems using background subtraction to identify foreground abnormalities, the computation of a proper background model over time plays an important role that dominates the system performance. For applications of long-term video surveillance, the computation of an up-to-date background model is needed to prevent incorrect detections of background scene changes, e.g., lighting variations from dawn to night, as foreground alarms. To this end, periodic updating of background model estimates is often adopted by many surveillance systems to learn background scene changes. We regard the approach of periodic background model updating as background model learning.

In last decades, many approaches addressing the problem of background model learning, e.g., C. Stauffer and W. Grimson, "Adaptive background mixture models for real-time tracking," in *Proc. IEEE Conf. CVPR*, vol. 2, pp. 246-252, 1999, have been proposed. For most background model learning systems, the frequencies of background model updating (for all pixel locations), also known as the model learning rates, have large effects on the system stability. (The definition of model learning rate is inherited from C. Stauffer and W. Grimson, "Adaptive background mixture models for real-time tracking," in Proc. IEEE Conf. CVPR, vol. 2, pp. 246-252, 1999.) Through periodic background model updating, various background scene changes, including lighting variations, resting objects, etc., will be adapted into a background model. The more frequently a background model is updated; the more scene variations are adapted into the learnt model, which results in a surveillance system (based on background subtraction) being more robust to background interferences and less sensitive to foreground abnormalities. As a result, applying high learning rates to a background model learning system will result in insensitive foreground detections to intruders in slow motion, because the system tends to incorporate slowly-moving intruders into its background model via frequent model update.

As most background model learning systems need to operate at moderate, but not high, learning rates to fit general surveillance conditions, gradual (and perhaps quick) lighting variations may thus be captured by the background models computed from these systems. However, for some over-quick, also regarded as drastic, lighting changes induced by, e.g., sudden sunshine varying, such systems may then become inefficient. Many false detections of foreground regions resulted from drastic lighting changes will hence be generated. The lack of efficient and effective ways in handling drastic lighting changes for general background model learning approaches motivates this invention.

To enhance the background model adaptation to lighting changes for general background model learning systems, a new system design is proposed by acquiring a lighting change processing unit as a post-processing module for these systems to revise their foreground region detection results under drastic lighting changes and to guide the dynamic adjustments of their model learning rates. With the proposed post-processing module, the capability of model adaptation to drastic lighting changes for general background model learning systems can be largely improved, without the need of manual tuning of model learning rates.

FIGS. 1A-1F give two examples of quick and over-quick (drastic) lighting changes. The image sequence shown in FIGS. 1A-1C records a laboratory with a CRT monitor displaying rolling interfaces and with quick lighting changes, wherein FIGS. 1A-1C show two images of image sequence $I^A$ recorded at 20 fps experiencing quick lighting changes. In this image sequence, it takes about three seconds to increase the average intensity by ~20%. This kind of quick variation in image brightness is able to be adapted by common background model learning approaches, e.g., C. Stauffer and W. Grimson, "Adaptive background mixture models for real-time tracking," in *Proc. IEEE Conf. CVPR*, vol. 2, pp. 246-252, 1999, by applying a higher learning rate (than the default value suggested in the paper). See FIGS. 2A and 2B for the simulated foreground region detection results for image frame $I_t^A$ by applying Stauffer and Grimson's method. On the other hand, for the case of over-quick lighting changes shown in FIGS. 1D-1E, which show two images of image sequence $I^B$ recorded at 15 fps experiencing over-quick (drastic) lighting changes, similar increases of image intensity are observed in less than one second for an outdoor environment. As shown in FIGS. 2C and 2D, which shows foreground region detection results for the image frame $I_t^B$ in over-quick lighting, many false detection results in foreground are received under such a condition by using the same approach with an identical learning rate setting. Instead, by applying the proposed background model learning system according to one embodiment of this invention, most false positives of foreground region detection are eliminated, as shown in FIGS. 2E and 2F.

SUMMARY OF THE INVENTION

The proposed invention addresses a new design of a background model learning system for lighting change adaptation that can be utilized in video surveillance applications. Specifically, the proposed system adopts any one of general background modeling learning approaches as its basic processing units for background model estimation and foreground region detection, and then acquires a lighting change processing unit as a post-processing module for revising the foreground region detection. The lighting changes processing unit is designed for reducing false foreground detections resulting from gradual, quick and drastic lighting changes. The revised foreground detection results by the lighting change processing unit can then be applied to next processing of, e.g., foreground object analysis, and sent back to the basic unit of background model estimation for dynamic adjustments of model learning rates.

DETAILED DESCRIPTION OF THE PREFERRED EMBODIMENTS

Figure 1A:
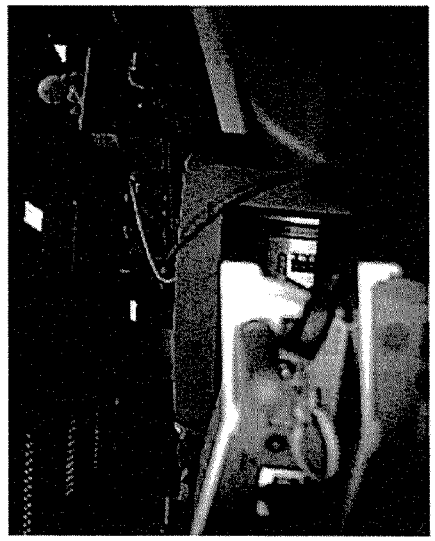
FIGS. 1A-1C show two snapshots of an image sequence in quick lighting changes and their image intensity variations via frame differencing.
Figure 1B:
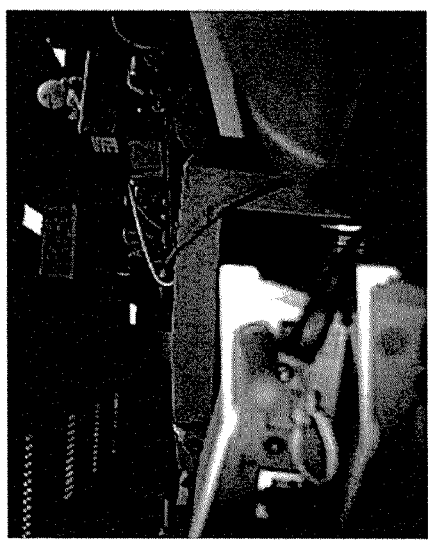
Figure 1C:
Figure 1D:
FIGS. 1D-1F show two snapshots of an image sequence in over-quick lighting changes and their image intensity variations via frame differencing.
Figure 1E:
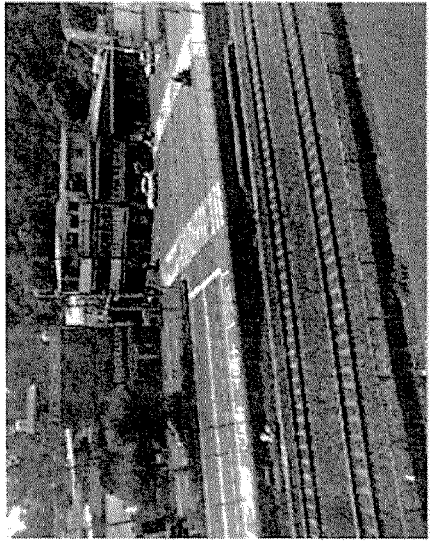
Figure 1F:
Figure 2A:
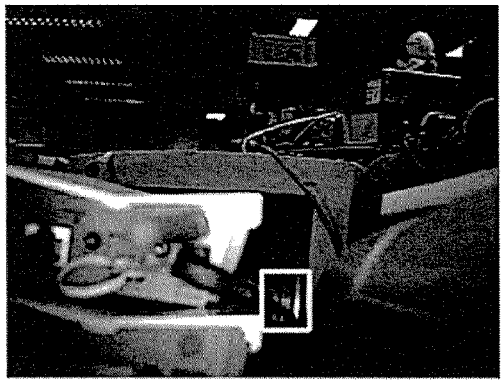
FIGS. 2A, 2B, 2C and 2D show the foreground region detection results for the two image sequences in quick and over-quick lighting changes, respectively, by using Stauffer and Grimson's background model learning method with an identical model learning rate.
Figure 2B:
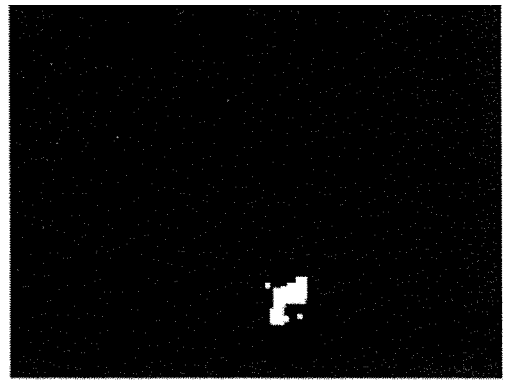
Figure 2C:
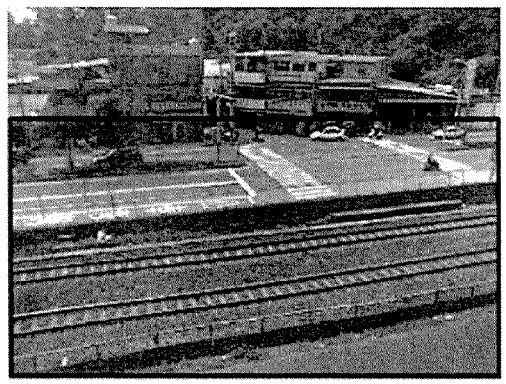
Figure 2D:
Figure 2E:
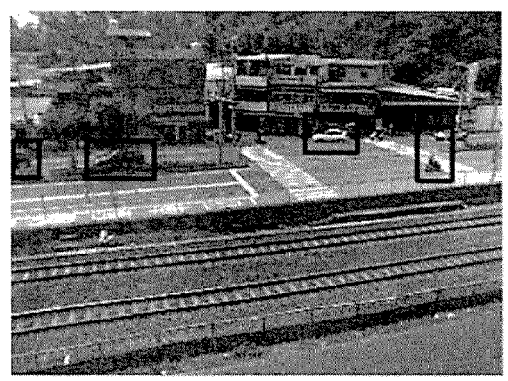
FIGS. 2E and 2F show the improved foreground region detection results for the image sequence in over-quick lighting changes by using the proposed system based on the same background model learning method and learning rate setting as FIGS. 2A, 2B, 2C and 2D.
Figure 2F:
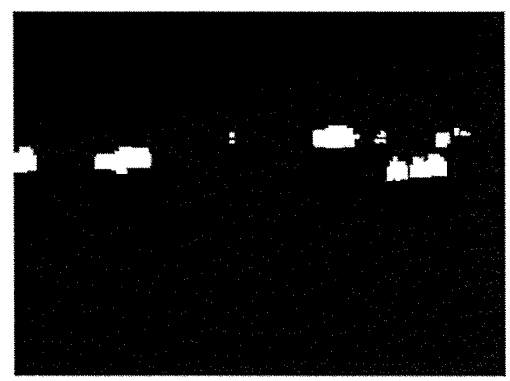

Reference will now be made in detail to the present embodiments of the invention, examples of which are illustrated in the accompanying drawings. Wherever possible, the same reference numbers are used in the drawings and the description to refer to the same or like parts. It is also to be understood that the detail description of the present embodiments is by examples and is intended to provide further explanation of the invention as claimed.

Figure 3:
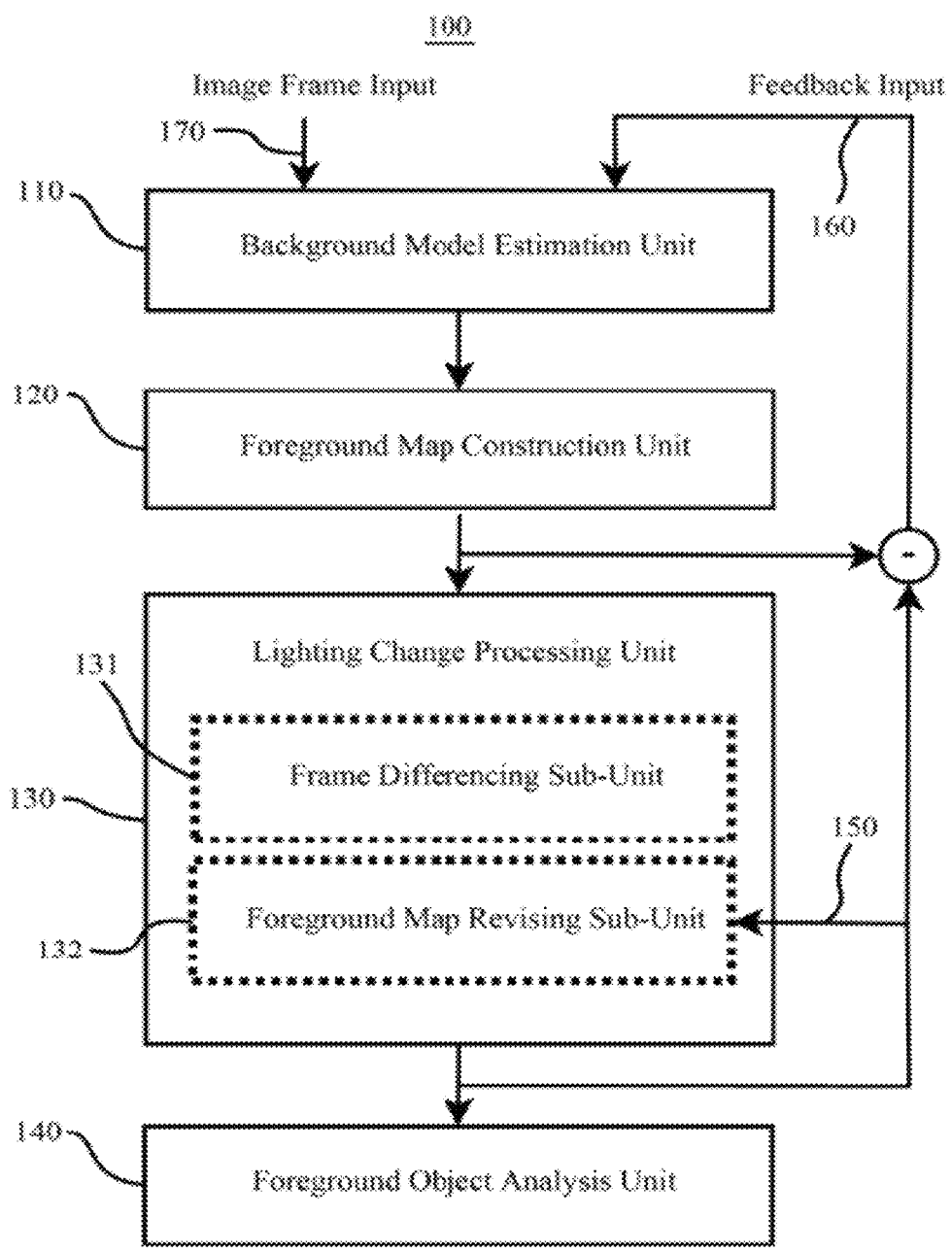
FIG. 3 shows a block diagram of the proposed background model learning system for lighting change adaptation, according to one embodiment of this invention.

FIG. 3 shows a block diagram of the proposed background model learning system for lighting change adaptation according to one embodiment of the invention. The proposed background model learning system 100 includes a background model estimation unit 110, a foreground map construction unit 120, a lighting change processing unit 130 and a foreground object analysis unit 140. The background model estimation unit 110 is in charge of the computation of a background model from an image sequence captured by, e.g, a static camera for a scene of interest, and can be realized by various approaches in literature, e.g., C. Stauffer and W. Grimson, "Adaptive background mixture models for real-time tracking," in *Proc. IEEE Conf. CVPR*, vol. 2, pp. 246-252, 1999, or D.-S. Lee, "Adaptive mixture learning in a dynamic system," U.S. Pat. No. 7,103,584 B2, 2006.

The estimated background model from the background model estimation unit 110 is then sent to the foreground map construction unit 120 to derive a reference foreground map that differentiates foreground regions from background ones via, e.g., background subtraction. Next, the lighting change processing unit 130 refines the reference foreground map derived by the foreground map construction unit 120 for eliminating false foreground regions induced by (drastic) lighting changes, and generates a revised foreground map as its output. The revised foreground map is then applied to the next unit of foreground object analysis 140, and sent back to the lighting change processing unit 130 and to the background model estimation unit 110 as feedbacks via the feedback links 150 and 160, respectively. For the foreground object analysis unit, different algorithms, e.g., connected component analysis, can be adopted for different applications in system design.

Specifically, the input of the background model estimation unit 110 is an image sequence $I_0, \ldots, I_t$, fed in frame by frame from the input link 170 up to the current time instance t. The image frame $I_t=\{I_{t,x}|\forall x\}$ of the current time instance t contains a plural number of pixel intensities $I_{t,x}$s whose format is, e.g., in grayscale for our discussion of a preferred embodiment. However, extensions of system embodiments from gray-scale images to color images in RGB, in YUV444/422/420, in Bayer-pattern-like format or in other color formats would be straightforward. Based on the input images, a background model denoted by a set $B_t=\{B_{t,x}|\forall x\}$ up to the current time instance t is computed by the background model estimation unit 110, wherein each set element $B_{t,x} \in B_t$ is a background model estimate for the pixel located at x. The core computation of the background model estimation unit 110 can be embodied by any one of general background model learning approaches. Without loss of generality, let $\alpha_{t,x}$ denote a model learning rate that controls the frequency of background model updating for a model estimate $B_{t,x}$ for a chosen background model learning approach. As will be elaborated later, dynamic adjustments of the model learning rates $\alpha_t=\{\alpha_{t,x}|\forall x\}$ can be realized by referencing the output of the lighting change processing unit 130 via the feedback link 160.

In the foreground map construction unit 120, a reference foreground map that differentiates foreground regions from background scenes is derived based on background subtraction from the background model $B_t$ generated by the background model estimation unit 110. More precisely, the reference foreground map of the time instance t is denoted by a set $F_t=\{F_{t,x}|\forall x\}$, where every set element $F_{t,x}$ can be a binary value ($F_{t,x} \in \{0, 1\}$) indicating the background (as 0) and foreground (as 1) label for a pixel at x, or can be a real value ($F_{t,x} \in \mathfrak{R}$) representing the possibility of being foreground for a pixel at x. Such an output of reference foreground map $F_t$ can be generated by most surveillance systems based background subtraction.

The lighting change processing unit 130 receives the reference foreground map $F_t$ as one of its inputs and generates a revised foreground map $F_{t'}$ that contains fewer false detections of foreground regions resulting from lighting changes. The idea behind the lighting change processing unit 130 is simple yet effective. While image intensity variation of over-quick lighting change may seem to be large among temporally distant image frames, it may be small between two consecutive frames if the frame rate of recording is high enough. The small and smooth change of image brightness between consecutive image frames provides a cue for eliminating false alarms in foreground detection for drastic, but not abrupt, lighting changes. (Note that the abrupt changes in background are regarded as salient deviations between two consecutive image frames, due to, e.g., light on/off.) For example, by thresholding the differences between corresponding pair of pixels, each from two consecutive frames, at a proper level, such false alarms can often be reduced.

Accordingly, the lighting change processing unit 130 performs the following computations for the case of the input reference foreground map $F_t$ in binary. First, the thresholding of intensity difference for every pixel pair is carried out by $$D_{t,x} = \begin{cases} 1 & |I_{t,x} - I_{t-N,x}| > T_d \\ 0 & \text{otherwise,} \end{cases}$$

where $I_{t,x}$ and $I_{t-N,x}$ are two pixel intensities of the time instances t and t−N (with N=1 for example), respectively, at the same pixel location x, $T_d(=10)$ is a given threshold, and $D_{t,x}$ is a binary indicator. Thus, a frame difference map $D_t=\{D_{t,x}|\forall x\}$ can be derived by the frame differencing sub-unit 131. Then, a revised foreground map $F_{t'}$ being less affected by lighting changes can be generated by a map combination of $$F_{t'} = F_t \text{ AND } (F_{t-1} \text{ OR } D_t)$$

in the foreground map revising mill 132, where $F_{t'-1}$ is the revised foreground map obtained at the previous time instance t−1 from the feedback link 150. For the initialization of the map combination in a recursive formulation, the map $F_{t'=0}$ is assigned to a set of zeros. Note that the OR operation in the map combination is designed for temporal accumulation of foreground regions, which is useful for detecting objects in slow motion. The revised foreground map $F_{t'}$ derived by the foreground map revising sub-unit 132 acts as the final output of the lighting change processing unit 130 at the current time instance t, and is transmitted to the foreground object analysis unit 140 for further analysis. Meanwhile, the map $F_{t'}$ is also sent back to the background model estimation unit 110 as one of its inputs via the feedback link 160.

The background model estimation unit 110 can now (for the current time instance t) apply the revised foreground map $F_{t'-1}$ of the previous time instance t−1 to the dynamic adjustments of the model learning rates $\alpha_{t,x}$s for (drastic) lighting change adaptation into the background model $B_t$. Specifically, denoted by $F_{t'-1}-F_{t-1}$ is a map fed in from the feedback link 160 to the background model estimation unit 110. The pixels of $P=\{x|F_{t'-1,x}-F_{t-1,x}<0\}$ represent the image regions of lighting changes detected by the lighting change processing unit 130. The corresponding learning rates of these pixels, i.e., $\{\alpha_{t,x}|x\delta P\}$, need to be increased in the background model estimation unit 110 for speedup the background model adaptation to lighting changes. A simple way of doing so is to set $$\alpha_{t,x} = \begin{cases} \alpha_H & \text{if } x \in P \\ \alpha_L & \text{otherwise,} \end{cases}$$

where $\alpha_H$ and $\alpha_L$ are two pre-defined rates for fast and normal background model learning, respectively. With the above dynamic adjustments of model learning rates, lighting changes can be adapted into the estimated background model $B_t$ in a quicker pace. False alarms caused by lighting changes will hence be reduced in the generation of the next reference foreground map $F_{t'}$.

Finally, the foreground object analysis unit 140 extracts foreground objects (if any) based on the current revised foreground map $F_{t'}$. For example, foreground objects (if any) may be extracted via connected component analysis or other object grouping methods. Above all, since one embodiment of this invention is the acquisition of a lighting change processing unit as a post-processing module for general-purpose background model estimation approaches, it can thus be easily integrated into existing background modeling systems to enhance their system robustness to lighting changes, without changing system architectures largely.

In another embodiment, the lighting change processing unit 130 may receive a reference foreground map $F_t$ in real value that denotes the possibilities of being foreground for map pixels. For this case, the frame differencing sub-unit 131 may compute a frame difference map $D_t$ in real value by applying $$D_{t,x} = f(|I_{t,x} - I_{t-N,x}|),$$

where $D_{t,x} \in D_t$ denotes a real-valued pixel of the frame difference map $D_t$ at the pixel location x of the current time instance t, and $f(\bullet) \in \Re$ is a transfer function that maps the absolute pixel difference to the possibility of being in changing for a pixel. The function $f(\bullet)$ can actually be embodied by a sigmoid function or other types of transfer functions. Then, the foreground map revising sub-unit 132 can utilize min/max operations to revise the reference foreground map $F_t$ and generate a revised foreground map $F_{t'}$ in real value by $$F_{t'} = \min(F_t, \max(F_{t'-1}, D_t)),$$

where the min/max operations are applied to the integration of the three input maps, $F_t$, $F_{t'-1}$, and $D_t$, in real value. Similarly, the set of pixels in lighting change for the dynamic adjustments of model learning rates in the background model estimation unit 110 can also be given by $P=\{x|F_{t'-1,x}-F_{t-1,x}<T_L\}$, where $T_L(=0)$ is a preset threshold.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A background model learning system for lighting change adaptation for video surveillance comprising:
   a background model estimation circuit that estimates a background model $B_t$ for a scene of interest as its output of the current time instance t from at least one input of an image frame $I_t$ of the current time instance t;
   a foreground map construction circuit that constructs a reference foreground map $F_t$ of the time instance t that is a set of binary pixels denoting foreground and background pixel labels or a set of real-valued pixels denoting their possibilities of being foreground by background model subtraction between the image frame $I_t$ and the estimated background model $B_t$; and
   a lighting change processing circuit that revises the reference foreground map $F_t$ by reducing false foreground regions resulting from lighting changes, comprising:
   a frame differencing sub-circuit that generates a frame difference map $D_t$ of the time instance t via subtracting a previous image frame $I_{t-N}$ of the time instance t−N from the current one $I_t$; and
   a foreground map revising sub-circuit that computes a revised foreground map $F_{t'}$ that has fewer regions of false foreground induced by lighting changes than the reference foreground map $F_t$ through integrating the frame difference map $D_t$, the reference foreground map $F_t$, and a feedback (revised foreground) map $F_{t'-1}$ derived at the previous time instance t−1;
   wherein the revised foreground map $F_{t'}$ acts as the output of the lighting change processing circuit at the current time instance t, and is then sent back to both the background model estimation circuit and the lighting change processing circuit as feedbacks for model learning rate tuning in background model estimation and map integration in lighting change processing, respectively, for the next time instance t+1,
   wherein the frame differencing sub-circuit for deriving the frame difference map $D_t$ in binary value of the current time instance t can be implemented by $$D_{t,x} = \begin{cases} 1 & |I_{t,x} - I_{t-N,x}| > T_d \\ 0 & \text{otherwise,} \end{cases}$$

where $D_{t,x} \in D_t$ denotes a binary-valued pixel of the frame difference map $D_t$ at the pixel location x of the time instance t, $I_{t,x}$ denotes a pixel value of the image frame $I_t$ at the pixel location x of the time instance t, $I_{t-N,x}$ denotes a pixel value of the image frame $I_{t-N}$ at the pixel location x of the time instance t−N, and $T_d$ is a given threshold for binarizing the difference value;

and the output of the frame differencing sub-circuit at the current time instance t is given by the frame difference map $D_t = \{D_{t,x} | \forall x\}$ denoting a set of binary-valued pixels $D_{t,x}$s.

2. The background model learning system for lighting change adaptation of claim 1, wherein the foreground map revising sub-unit for deriving the revised foreground map $F_{t'}$ in binary value can be implemented by $$F_{t'} = F_t \text{ AND } (F_{t'-1} \text{ OR } D_t),$$

where the logical operations are applied to the integration of the three binary maps, i.e., the frame difference map $D_t$, the reference foreground map $F_t$, and the revised foreground map $F_{t'-1}$ fed in at the previous time instance t−1, into the revised foreground map $F_{t'}$;

and the output of the foreground map revising sub-unit at the current time instance t is given by the revised foreground map $F_{t'} = \{F_{t',x} | \forall x\}$ denoting a set of binary-valued pixels $F_{t',x} \in \{0 \text{(background)}, 1\text{(foreground)}\}$.

3. The background model learning system for lighting change adaptation of claim 1, wherein the frame differencing sub-unit for deriving a frame difference map $D_t$ in real value can be implemented by $$D_{t,x} = f(|I_{t,x} - I_{t-N,x}|),$$

where $D_{t,x} \in D_t$ denotes a real-valued pixel of the frame difference map $D_t$ at the pixel location x of the current time instance t, $I_{t,x}$ denotes a pixel value of the image frame $I_t$ at the pixel location x of the time instance t, $I_{t-N,x}$ denotes a pixel value of the image frame $I_{t-N}$ at the pixel location x of time instance t−N, and $f(\bullet) \in \Re$ is a transfer function that maps the absolute pixel difference to the possibility of being in changing for a map pixel;

and the output of the frame differencing sub-unit at the time instance t is given by the frame difference map $D_t = \{D_{t,x} | \forall x\}$ denoting a set of real-valued pixels $D_{t,x}$s.

4. The background model learning system for lighting change adaptation of claim 3, wherein the transfer function $f(\bullet)$ can be embodied by the absolute pixel differencing $|I_{t,x} - I_{t-N,x}|$ or a sigmoid transfer function of $|I_{t,x} - I_{t-N,x}|$.

5. The background model learning system for lighting change adaptation of claim 1, wherein the foreground map revising sub-unit for deriving a revised foreground map $F_{t'}$ in real value can be implemented by $$F_{t'} = \min(F_t, \max(F_{t'-1}, D_t)),$$

where the min/max operations are applied to the integration of the three real-valued maps, i.e., the frame difference map $D_t$, the reference foreground map $F_t$, and the revised foreground map $F_{t'-1}$ fed in at the previous time instance t−1, into the revised foreground map $F_{t'}$;

and the output of the frame differencing sub-unit at the current time instance t is given by the revised foreground map $F_{t'} = \{F_{t',x} | \forall x\}$ denoting a set of real-valued pixels $F_{t',x} \in \Re$.

6. The background model learning system for lighting change adaptation of claim 1, wherein the background model estimation unit and foreground map construction unit for computing a background model of a scene of interest can be embodied by general background model learning approaches that adopt periodic background model update as the core computation.

7. The background model learning system for lighting change adaptation of claim 1, wherein the inputs of the background model estimation unit further comprises:
an image frame input of $I_t$ of the time instance t; and
a feedback input of the (mathematical) combination of both the reference foreground map $F_{t-1}$ and the revised foreground map $F_{t'-1}$ derived at the previous time instance t−1 for tuning the model learning rates in the background model estimation unit such that the background model estimation unit can increase (or reset) the model learning rates for the pixels in (or not in) lighting change.

8. The image frame input of the background model estimation unit of claim 7, can be generated by
a camera that captures image frames of a scene of interest and transmits the captured image frames to the background model estimation unit.

9. The background model learning system for lighting change adaptation of claim 1, wherein each input image frame can be in grayscale, in RGB color, in YUV444/422/420 or in Bayer-pattern-like format.

* * * * *